(12) United States Patent
Fujita

(10) Patent No.: US 7,096,170 B2
(45) Date of Patent: Aug. 22, 2006

(54) METHOD OF ASSISTING THE DESIGN OF A VEHICULAR SUSPENSION

(75) Inventor: Shigehisa Fujita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 737 days.

(21) Appl. No.: 09/820,230

(22) Filed: Mar. 29, 2001

(65) Prior Publication Data
US 2001/0032065 A1    Oct. 18, 2001

(30) Foreign Application Priority Data
Mar. 29, 2000    (JP)    .............................. 2000-091188

(51) Int. Cl.
G06G 7/48    (2006.01)
G06F 17/10    (2006.01)

(52) U.S. Cl. ........................ 703/8; 703/2; 703/6; 703/7; 701/36; 701/37; 345/473

(58) Field of Classification Search ................. 703/1, 703/2, 6, 7, 8; 700/90, 118; 701/36, 37; 345/473
See application file for complete search history.

(56) References Cited

U.S. PATENT DOCUMENTS

| | | | |
|---|---|---|---|
| 4,930,082 A * | 5/1990 | Harara et al. ................. | 701/38 |
| 4,952,152 A * | 8/1990 | Briggs et al. ................. | 434/69 |
| 4,989,148 A * | 1/1991 | Gurke et al. ................... | 701/37 |
| 5,253,189 A * | 10/1993 | Kramer ........................... | 703/7 |
| 5,297,057 A * | 3/1994 | Kramer et al. ................... | 703/7 |
| 5,327,655 A * | 7/1994 | Buchesky et al. ............. | 33/288 |
| 5,347,457 A * | 9/1994 | Tanaka et al. ................. | 701/37 |
| 5,430,646 A * | 7/1995 | Kimura et al. ................. | 701/37 |
| 5,430,647 A * | 7/1995 | Raad et al. .................... | 701/38 |
| 5,430,648 A * | 7/1995 | Sasaki ........................... | 701/37 |
| 5,477,453 A * | 12/1995 | Harashima .................... | 701/37 |
| 5,550,739 A * | 8/1996 | Hoffmann et al. ............. | 701/37 |
| 5,880,362 A * | 3/1999 | Tang et al. .................... | 73/146 |
| 5,942,673 A * | 8/1999 | Horiuchi et al. ........... | 73/11.04 |
| 6,077,302 A * | 6/2000 | Kumra et al. .................. | 703/7 |
| 6,192,745 B1 * | 2/2001 | Tang et al. .................... | 73/146 |

(Continued)

FOREIGN PATENT DOCUMENTS

JP    10254939    9/1998

OTHER PUBLICATIONS

"Crash Compatibility of the Ultralight Steel Auto Body with Cars of the Same Size" Aramayo et al, 2000-01-2717, SAE 2000.*

(Continued)

*Primary Examiner*—Fred Ferris
(74) *Attorney, Agent, or Firm*—Birch, Stewart, Kolasch & Birch, LLP

(57) ABSTRACT

To provide a method of assisting in the design of a vehicular suspension by allowing definition points inherent in suspensions to be easily recognized regardless of the different types and mechanisms thereof, and allowing specification values to be simply entered at the definition points. A method of assisting in the design of a vehicular suspension to generate a simulation model for a suspension using a CAD system includes the steps of indicating a suspension to be designed, opening a specification value entering window for entering specification values inherent in the indicated suspension, entering specification values at definition points inherent in the indicated suspension in the specification value entering window, and generating a simulation model based on the specification values at the definition points.

17 Claims, 11 Drawing Sheets

U.S. PATENT DOCUMENTS

| | | | |
|---|---|---|---|
| 6,212,466 B1 * | 4/2001 | Ulyanov et al. | 701/99 |
| 6,263,300 B1 * | 7/2001 | Strumolo et al. | 703/8 |
| 6,496,761 B1 * | 12/2002 | Ulyanov et al. | 701/37 |
| 6,651,037 B1 * | 11/2003 | Hall et al. | 703/8 |
| 6,701,236 B1 * | 3/2004 | Ulyanov et al. | 701/40 |
| 6,725,168 B1 * | 4/2004 | Shiraishi et al. | 702/81 |
| 6,864,885 B1 * | 3/2005 | Fujita | 345/420 |
| 2003/0014230 A1 * | 1/2003 | Hagelin | |

OTHER PUBLICATIONS

"LS-DYNA News", Issue 1/97 February, Livermore Software Technology, 1997.*

"SimDesigner Suspension", Product Specification, MSC Software, 2004.*

"ADAMS/Car in the Vehicle Development Process Uning Suspension and Full Vehicle Features", S.M. Esch, Audi AG Ingolstadt, I/EF-21, Nov. 1997.*

"Getting Started Using ADAMS/Car", Mechanical Dynamics Inc. Copyright 2000.*

"Simulating Reality", MSC Software Newsletter Issue 8, p. 3, Oct. 1999.*

"Linking ADAMS/Car and Advisor for Advanced Vehicle Evaluation", K. Wipke, 2000 International Adams Users Converence, 2000.*

* cited by examiner

METHOD OF ASSISTING THE DESIGN OF A VEHICULAR SUSPENSION

CROSS-REFERENCE TO RELATED APPLICATION

The present application claims priority under 35 U.S.C. § 119 to Japanese Patent Application No. 2000-091188, filed Mar. 29, 2000, the entire contents of which are hereby incorporated by reference.

BACKGROUND OF THE INVENTION

1. Field of the Invention

The present invention relates to a method of assisting the design of a vehicular suspension to generate a simulation model for a suspension using a CAD system. In particular, the present invention is directed to a method of assisting the design of a vehicular suspension by easily entering specification values at predetermined definition points irrespectively of the type, mechanism, etc. of the suspension.

2. Description of Background Art

There has previously been proposed a design assisting system for hypothetically assembling a three-dimensional model of an object to be designed on a computer before a prototype of the object is actually made. In this system, it is detected whether components of the object interfere with each other or not for the convenience of the designer in order to confirm the suitability of the layout of the components of the object.

In order to produce an accurate three-dimensional model, it is necessary to enter spatial coordinates of major parts of the three-dimensional model and accurately define operating points thereof. If the three-dimensional model is fixed, since the positions and number of definition points whose coordinates are to be entered are evident, the numerical values are entered from a ten key pad on a keyboard or the like.

It is assumed that the conventional design assisting system is applied to the designing of a vehicular suspension. As well known in the art, vehicular suspensions include those for use on two-wheeled vehicles and those for use on four-wheeled vehicles. Vehicular suspensions are available in a plurality of types including a strut type, a (double) wishbone type, a trailing arm type, and a multi-link type. Furthermore, suspensions of one type have different mechanisms depending on whether they are applied to drive wheels or driven wheels. In addition, depending on whether the vehicular suspensions are applied to steerable wheels or not, different types and mechanisms for suspensions result in different positions and different numbers of definition points whose spatial coordinates are to be entered. In view of this, the operator cannot immediately recognize the positions and number of definition points whose spatial coordinates are to be entered. The operator needs expenditure of time and labor to enter the spatial coordinates, and may not enter all of the spatial coordinates correctly.

SUMMARY OF THE INVENTION

It is an object of the present invention to provide a method of assisting in the design of a vehicular suspension in a manner to solve the above conventional problems by allowing definition points inherent in suspensions to be easily recognized regardless of the different types and mechanisms for vehicular suspensions, and allowing specification values to be simply entered at the definition points.

To achieve the above object, there is provided in accordance with the present invention a method of assisting in the design of a vehicular suspension to generate a simulation model of a suspension using a CAD system, comprising the steps of: indicating a suspension to be designed; opening a specification value entering window for entering specification values inherent in the indicated suspension; entering specification values at definition points inherent in the indicated suspension in the specification value entering window; and generating a simulation model based on the specification values at the definition points.

According to the above features, when a suspension to be designed is indicated, inherent definition points where specification values such as spatial coordinates have to be entered for generating a simulation model of the suspension are displayed. Therefore, the operator can easily recognize the definition points where specification values need to be entered regardless of the type and mechanism of the suspension.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a view showing another example of the specification value entering window Win;

FIG. 7 is a view showing still another example of the specification value entering window Win;

DESCRIPTION OF THE PREFERRED EMBODIMENTS

Figure 1:
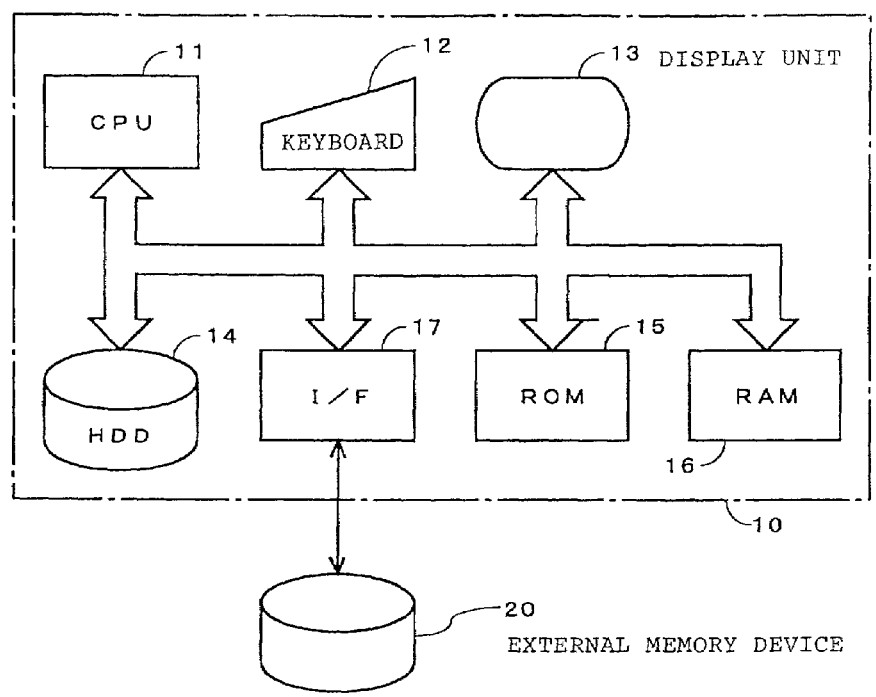
FIG. 1 is a block diagram of an arrangement of a CAD system to which a method of assisting in the design of a vehicular suspension according to the present invention is applied.

The present invention will hereinafter be described in detail with reference to the accompanying drawings. FIG. 1 is a block diagram of a CAD system to which the present invention is applied. The CAD system comprises a CPU 11, a keyboard 12 and a display unit 13 as a man-machine interface, an internal memory device (HDD) 14 which stores a main program of the CAD system and image data of three-dimensional models, a ROM 15 storing reference data, etc., a RAM 16 functioning as a working area of the CPU 11, an external interface 17, and an external memory device 20 connected via the external interface 17.

Parameters indicating a suspension to be designed and specification values specifying the configuration of the suspension are entered from the keyboard 12. The internal memory device 14 stores a plurality of typical three-dimensional models of suspensions of different types and mechanisms. The internal memory device 14 and the external memory device 20 are not limited to the above applications, but either one of them may be selected as desired as a device for storing programs and data.

Figure 2:
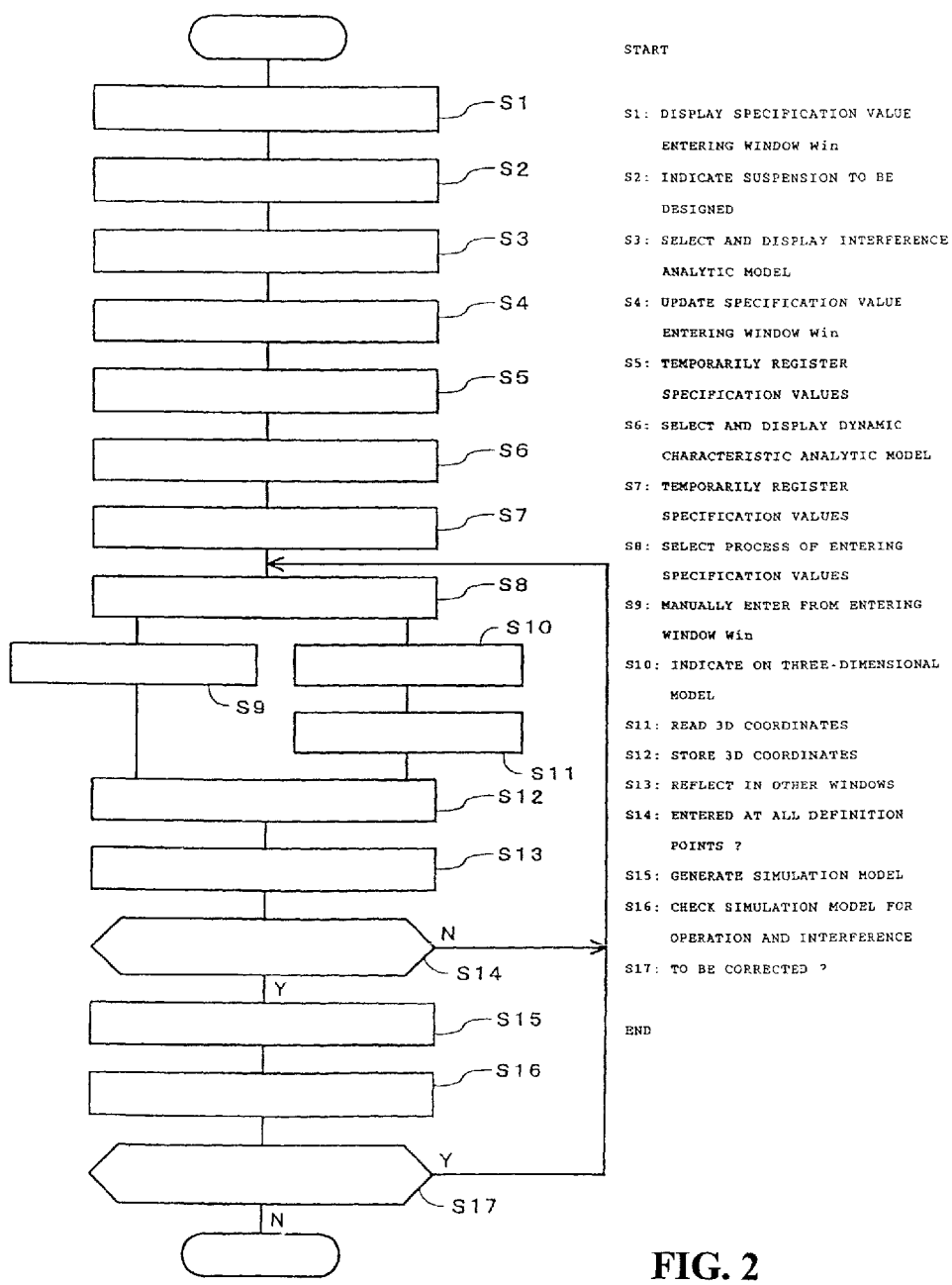
FIG. 2 is a flowchart of an operation sequence of an embodiment of the present invention.

Operation of the CAD system will be described below with reference to a flowchart shown in FIG. 2 and displayed images shown in FIGS. 3 through 11.

Figure 3:
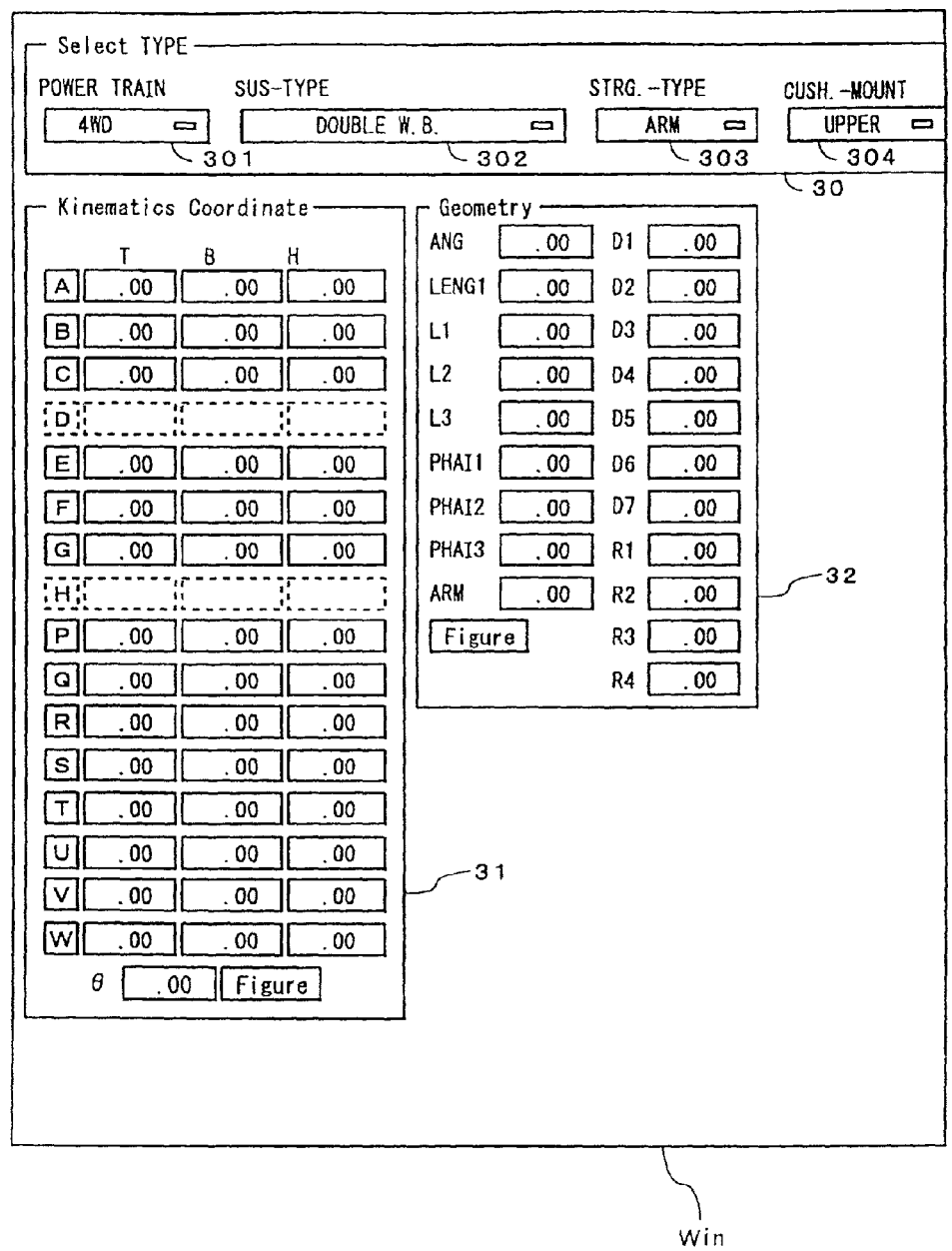
FIG. 3 is a view showing an example of a specification value entering window Win.

In step S1, a specification value entering table for indicating the type and mechanism of a suspension to be designed and the drive system of a vehicle to which the suspension is applied is read from the internal memory device 14, and displayed in a specification value entering window Win opened on the display unit 13. FIG. 3 shows the specification value entering window Win by way of example. The specification value entering table includes a select type area 30 for indicating the type of a suspension, etc., a kinematics coordinate area 31 for entering spatial (three-dimensional) coordinates as specification values at given definition points of a three-dimensional model, and a geometry area 32 for entering the lengths, angles, etc. of mechanisms as specification values.

The select type area 30 has an icon button 301 for selecting a drive system (POWER TRAIN), an icon button 302 for selecting a suspension type (SUS-TYPE), an icon button 303 for selecting a steering link mechanism (STRG.-TYPE), and an icon button 304 for selecting a cushion spring mounting position (CUSH.-MOUNT).

In step S2, the icon buttons 301–304 are operated to indicate a suspension to be designed. In the example shown in FIG. 3, a four-wheel drive (4WD) is indicated as the drive system, a double wishbone (DOUBLE W.B.) suspension as the suspension type, an arm link mechanism (ARM) as the steering link mechanism, and an upper arm (UPPER) as the cushion spring mounting position.

After the suspension type and other details are indicated, a typical interference analytic model (first analytic model) of the suspension that satisfies the present selected conditions is selectively read from the internal memory device 14 and displayed on the display unit 13 in step S3.

Figure 4:
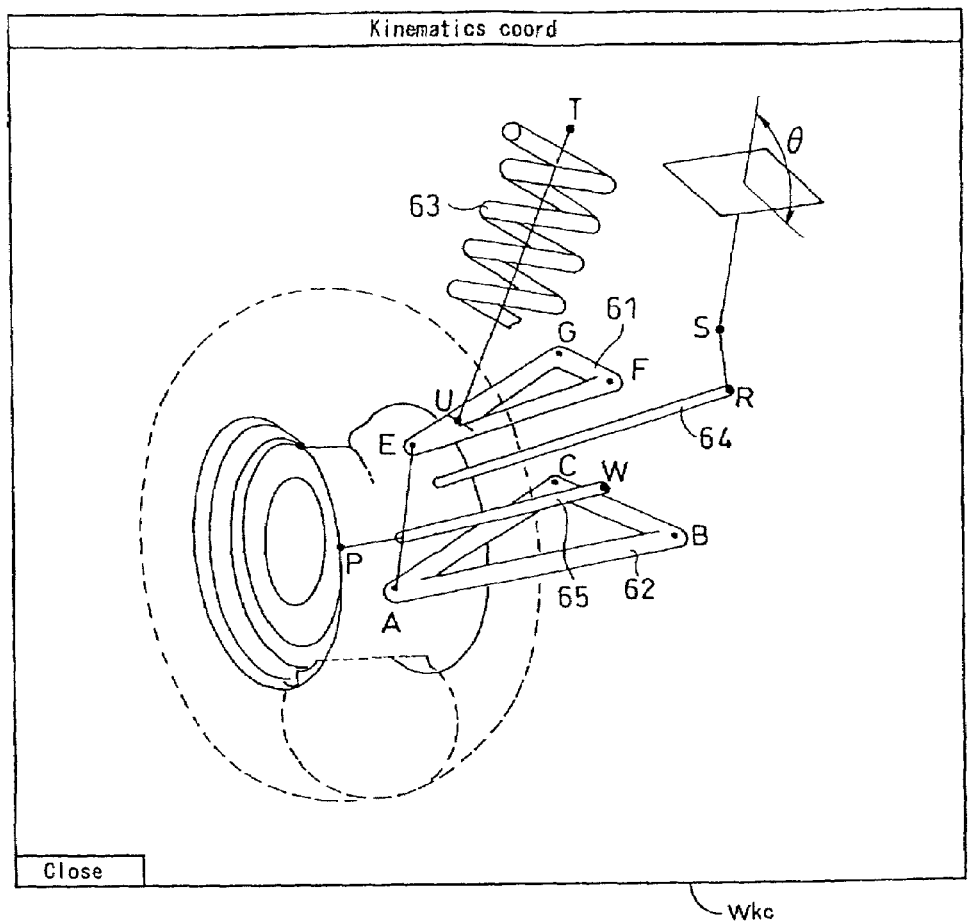
FIG. 4 is a view showing a displayed example of an interference analytic model corresponding to the specification value entering window Win shown in FIG. 3.

FIG. 4 shows a displayed example of the interference analytic model. An interference analytic window Wkc, which is different from the specification value entering window Win, is opened and displayed. The interference analytic model is used to make various analyses including an analysis of whether there is an interference between various parts or not.

Since the double wishbone suspension applied to the four-wheel drive vehicle is selected, the interference analytic model has two upper and lower suspension arms, i.e., an upper arm 61 and a lower arm 62, a tie rod 64, and a drive shaft 65. Furthermore, since the arm link mechanism is selected as the steering link mechanism and the upper arm 61 is selected as an arm to which a coil spring 63 is mounted, the coil spring 63 is coupled to the upper arm 61.

The lower arm 62 has a swingable end at a definition point A, and two swing fulcrums at definition points B, C. Similarly, the upper arm 61 has a swingable end at a definition point E, and two swing fulcrums at definition points F, G. The coil spring 63 has an upper end at a definition point T. The coil spring 63 and the upper arm 61 are coupled to each other at a definition point U. The tie rod 64 and a steering rod are coupled to each other at a definition point R, and the steering rod and a steering shaft are coupled to each other at a definition point S. The drive shaft 65 has opposite ends at definition points P, W. A definition point 0 represents an angle at which the steering shaft is attached.

In step S4, in the specification value entering window Win, specification value entering boxes for definition points where spatial coordinates do not need to be entered are changed from a dark color to a light color, visually indicating that spatial coordinates do not need to be entered, and disabling the entry of specification values into those boxes. In the combination of "4WD", "DOUBLE W.B.", "ARM", "UPPER", as with the illustrated embodiment, the specification value entering boxes for the definition points D, H are displayed in a light color, disabling the entry of specification values into those boxes.

According to the present embodiment, as described above, when parameters indicating a suspension type, a drive system of a vehicle to which the suspension is applied, etc. are indicated, all definition points required to generate a simulation model of the suspension are selected. Therefore, irrespective of the suspension type and other details, the operator can enter all necessary specification values by entering specification values at the selected definition points, thereby simply and reliably generating a desired simulation model.

Figure 5:
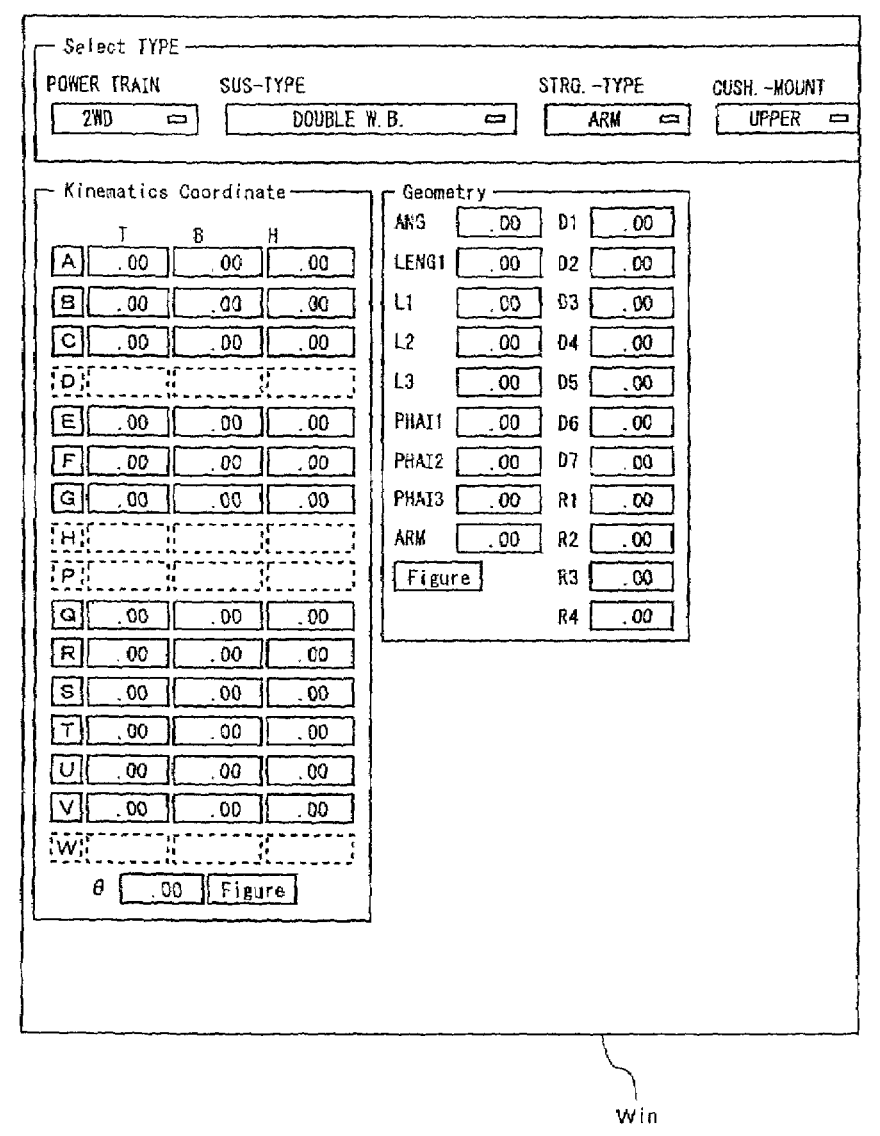

FIG. 5 shows another displayed example of the specification value entering window Win for a suspension type different from the above suspension type. In the displayed example, a two-wheel drive (2WD) is indicated as the drive system, a double wishbone suspension as the suspension type, an arm link mechanism as the steering link mechanism, and an upper arm as the cushion spring mounting position.

Figure 6:
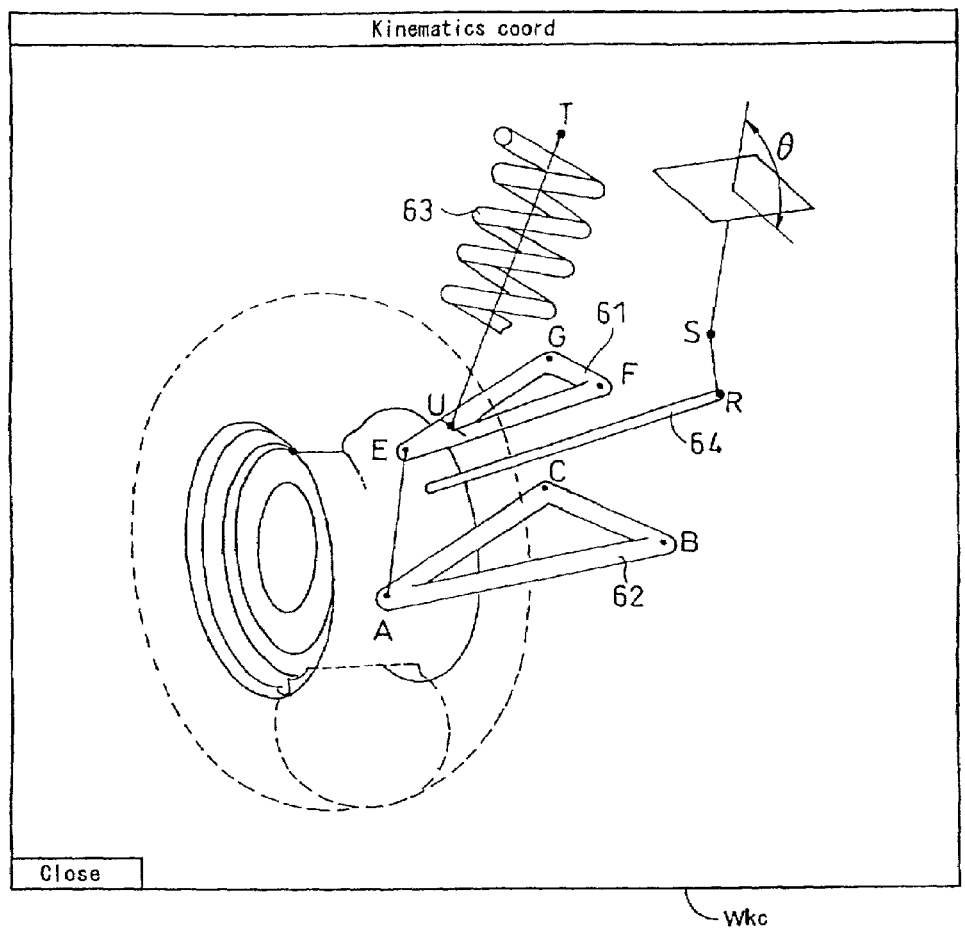
FIG. 6 is a view showing a displayed example of an interference analytic model corresponding to the specification value entering window Win shown in FIG. 5.

FIG. 6 shows a displayed example of the interference analytic model that is selectively read from the internal memory device 14 based on the above indicated details. As is apparent from a comparison between FIGS. 4 and 6, since the 2WD system is indicated, the drive shaft 65 is omitted from the display. In the specification value entering window Win shown in FIG. 5, the definition points P, W relative to the drive shaft 65 are added as points that do not need to be defined.

Figure 7:
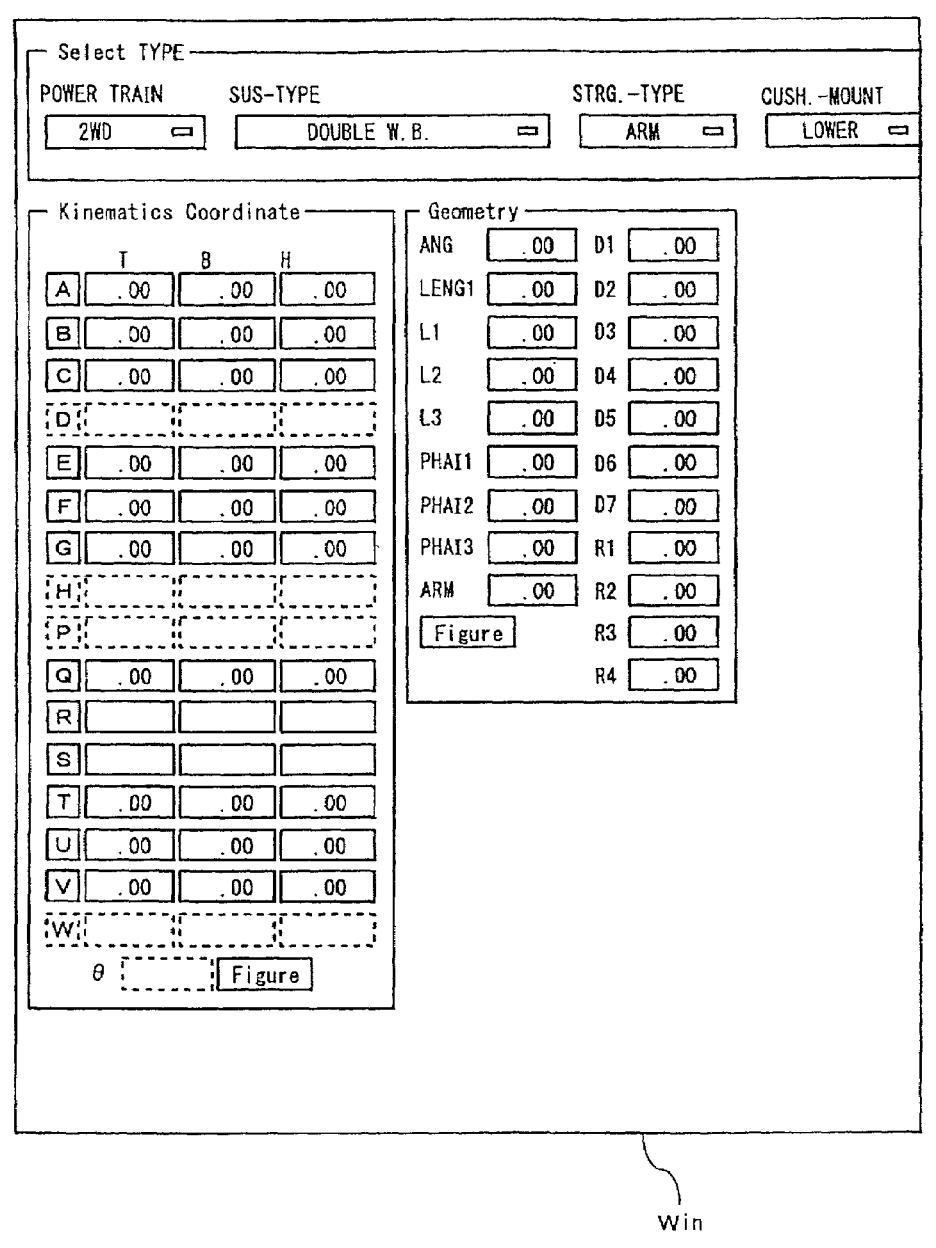

FIG. 7 shows still another displayed example of the specification value entering window Win for a suspension type different from the above suspension type. In the displayed example, a two-wheel drive (2WD) is indicated as the drive system, a double wishbone suspension as the suspension type, an arm link mechanism as the steering link mechanism, and a lower arm as the cushion spring mounting position.

Figure 8:
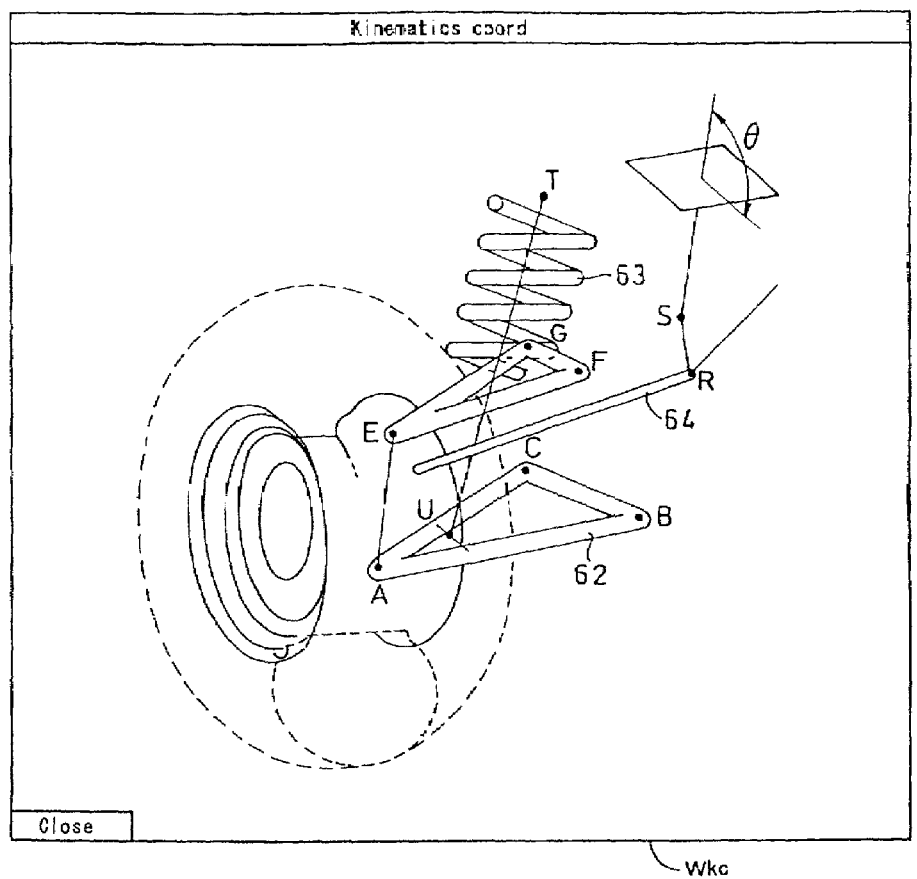
FIG. 8 is a view showing a displayed example of an interference analytic model corresponding to the specification value entering window Win shown in FIG. 7.

FIG. 8 shows a displayed example of the interference analytic model which is selectively read from the internal memory device 14 based on the above indicated details. As is apparent from a comparison between FIGS. 6 and 8, the coil spring 63 is connected to the lower arm 62.

Figure 9:
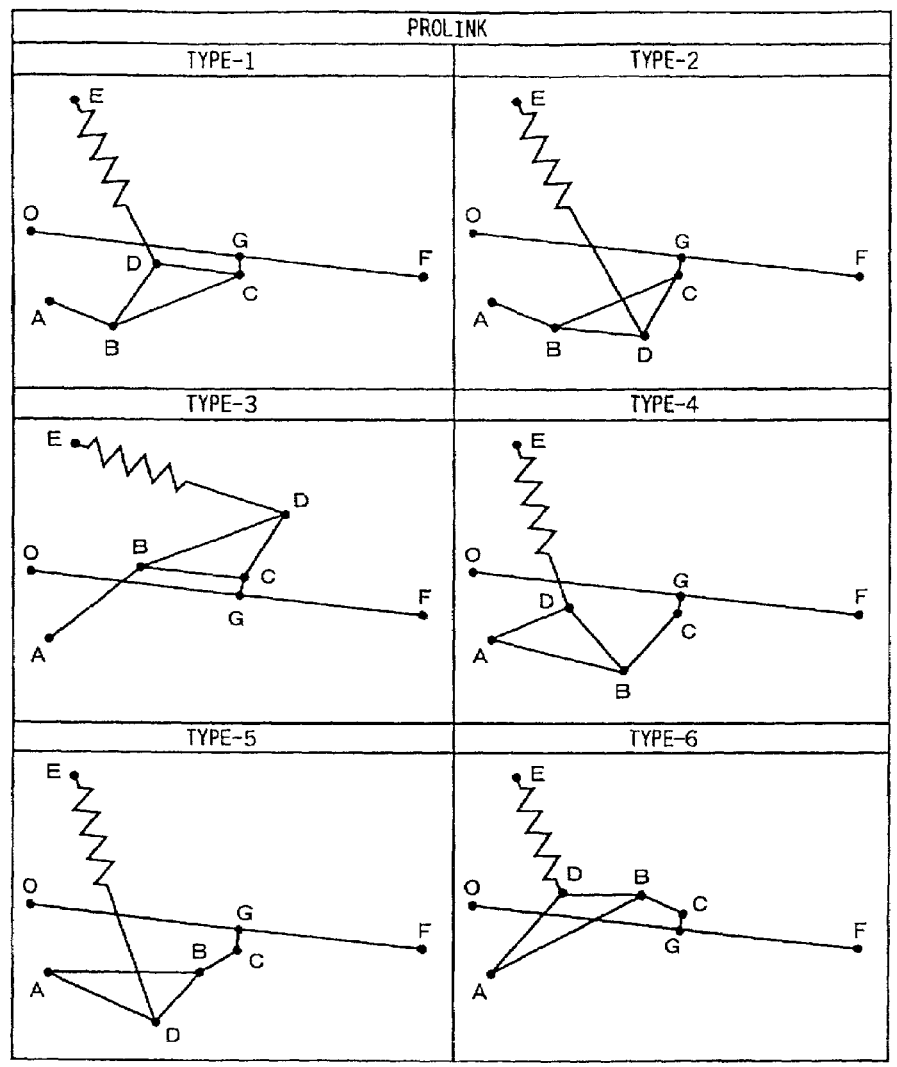
FIG. 9 is a view showing a displayed example of an interference analytic window Wkc.

If a progressive suspension that is primarily a rear-wheel suspension for motorcycles is indicated as a suspension type, then, as shown in FIG. 9, a list of three-dimensional models of a plurality of progressive suspensions having different link mechanisms is displayed at a reduced scale in the interference analytic window Wkc. When the operator indicates a desired link mechanism, only an interference analytic model thereof is displayed at an enlarged scale in the interference analytic window Wkc. In FIG. 9, definition points A, G are points where links B, C, D are mounted on the vehicle body, and a definition point E is a point where a cushion spring is mounted on the vehicle body. In this embodiment, a suspension type can freely be selected regardless of whether the vehicle is a two-wheeled vehicle or a four-wheeled vehicle.

After the suspension is indicated, specification values (spatial coordinates) at the respective definition points A, B, C, . . . of the above typical interference analytic model are temporarily automatically registered (not shown) in the corresponding specification value entering boxes in the specification value entering window Win in step S5.

In step S6, a typical dynamic characteristic analytic model (second analytic model) of the suspension which satisfies the present indicated conditions is selectively read from the internal memory device 14, and its three-dimensional model is displayed on the display unit 13.

Figure 10:
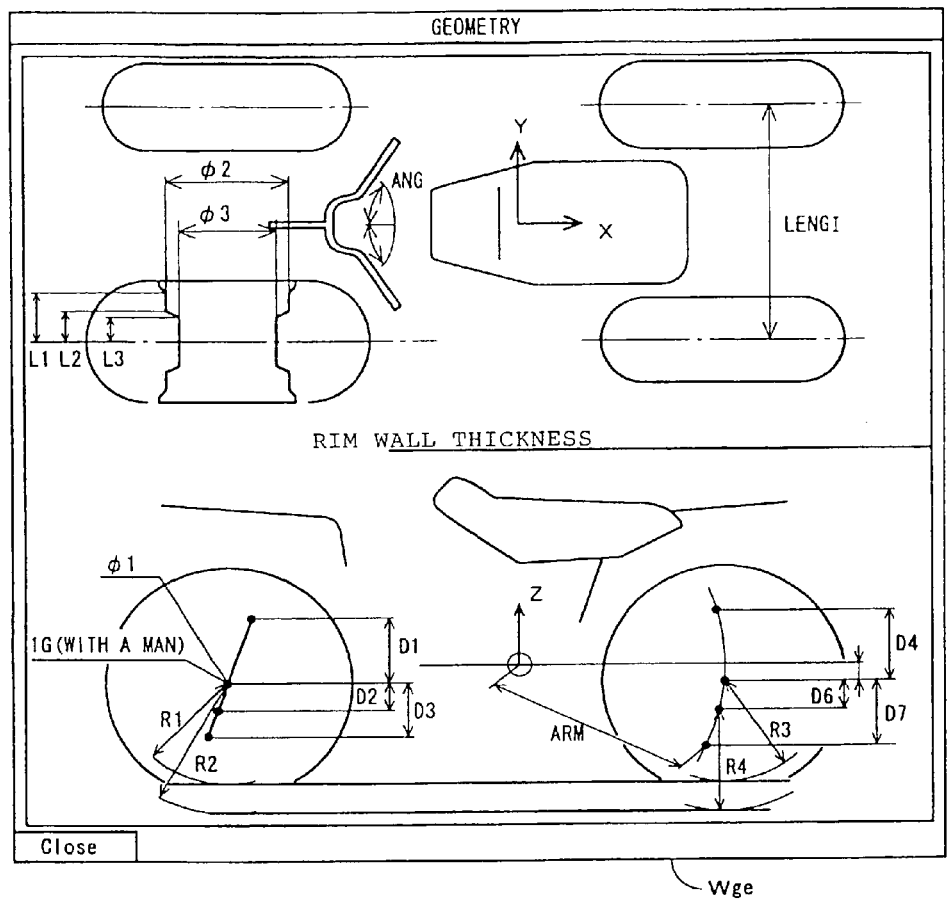
FIG. 10 is a view showing an example of a dynamic characteristic analytic model displayed in a dynamic characteristic analytic window Wge.

FIG. 10 shows a displayed example of the dynamic characteristic analytic model. A dynamic characteristic analytic window Wge, which is different from the specification value entering window Win and the interference analytic window Wkc, is newly opened and displayed.

In the dynamic characteristic analytic window Wge, a wheel diameter is represented by a definition point $\Phi 1$, a wheel outside diameter by a definition point $\Phi 2$, a wheel inside diameter by a definition point $\Phi 3$, various wheel thicknesses by definition points L1, L2, L3, and a rim wall thickness by a definition point (not shown). Compression strokes of front and rear wheels are represented by definition points D1, D4, expansion strokes of the front and rear wheels by definition points D3, D7, and strokes of the front and rear wheels when the vehicle is occupied by passengers and is not occupied by passengers by definition points D2, D6.

In step S7, specification values (spatial coordinates) at the definition points $\Phi 1$, $\Phi 2$, . . . of the above typical dynamic characteristic analytic model are temporarily automatically registered (not shown) in the corresponding specification value entering boxes in the specification value entering window Win.

After the suspension to be designed is indicated and the specification value entering window Win, the interference analytic window Wkc, and the dynamic characteristic analytic window Wge are opened, a process of updating and entering the temporarily registered specification values depending on the desired suspension configuration is selected in step S8.

If an entry from the specification value entering window Win is selected, then the operator confirms the positions of the definition points A, B, . . . , $\Phi 1$, $\Phi 2$, . . . in the windows Wkc, Wge while the interference analytic window Wkc and the dynamic characteristic analytic window Wge are being displayed together with the specification value entering window Win in the same displayed view, and enters, from the keyboard 12, desired specification values into the numerical value entry boxes in the specification value entering window Win which are denoted by the same symbols as those assigned to the definition points in the analytic windows Wkc, Wge, in step S9. The spatial coordinates temporarily registered in steps S5, S7 are now updated depending on the desired suspension configuration. In step S12, the entered and changed specification values are stored in the external memory device 20 in association with their definition points.

In the present embodiment, inasmuch as the symbols representing the positions of the definition points are displayed in superposed relation to the interference analytic model and the dynamic characteristic analytic model, the operator can visually recognize the positions of the definition points. Therefore, it is easy for the operator to visually recognize specification values that are entered at the respective definition points.

If an entry is to be made from the interference analytic window Wkc (or the dynamic characteristic analytic window Wge), then definition points of the interference analytic model in the interference analytic window Wkc are dragged to move spatial coordinates thereof for thereby changing the model configuration in step S10. In step S11, the coordinates of the moved definition points are read as specification values. In step S12, the specification values of the moved definition points are stored in the external memory device 20 in association with their definition points.

In step S13, the specification values updated or entered in step S9 are reflected in the interference analytic window Wkc and the dynamic characteristic analytic window Wge, and the model configuration is deformed depending on the specification values. If specification values have been entered or updated in steps S10, S11, then they are reflected in the specification value entering window Win, and the numerical values in the corresponding specification value entering boxes are changed depending on the updated spatial coordinates.

In the present embodiment, as described above, when definition points are entered or updated in any one of the specification value entering window Win, the interference analytic window Wkc, and the dynamic characteristic analytic window Wge, the entered or updated definition points are reflected in each of the other windows. Therefore, specification values may be entered or updated at definition points in any one of these windows.

Figure 11:
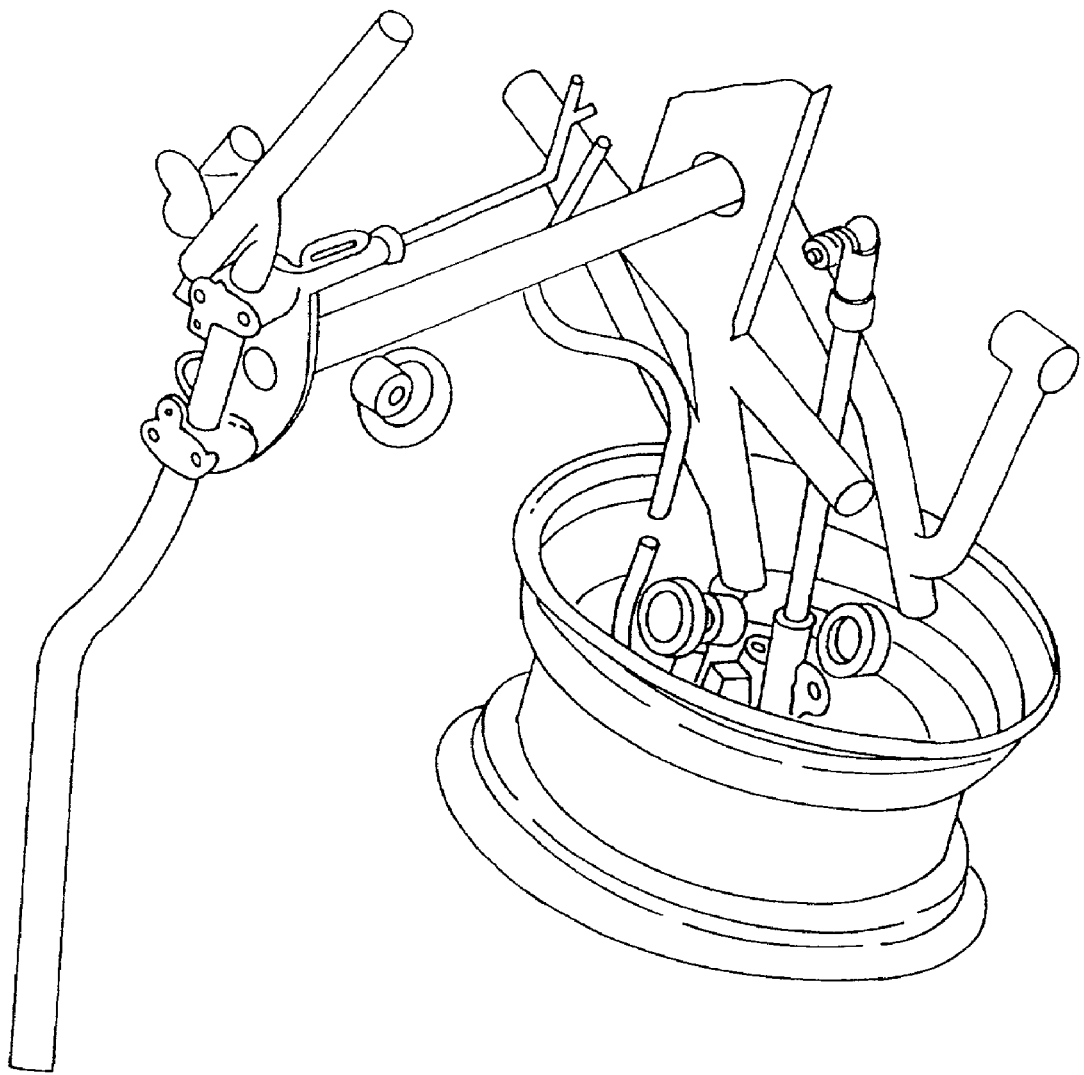
FIG. 11 is a view showing a displayed example of a simulation model.

In step S14, it is determined whether specification values have been entered or updated at all the definition points or not. If there is a definition point where no specification value has been entered or updated, then control goes back to step S7 to repeat the above processing. If specification values have been entered or updated at all the definition points, then the specification values at the definition points are registered in the external memory device 20, and a three-dimensional simulation model shown in FIG. 11 is generated in step S15.

In step S16, the simulation model is checked for its operation and interference. In step S17, it is determined whether the simulation model needs to be corrected or not. If there is any interfering area, then control goes back to step S8 to correct a corresponding definition point.

The present invention offers the following effects:

When parameters indicating a suspension type, a drive system of a vehicle to which the suspension is applied, etc. are indicated, all definition points for specification values required to generate a three-dimensional simulation model of the suspension are selected. Therefore, irrespective of the suspension type and other details, the operator can enter all necessary specification values by entering specification values at the selected definition points, thereby simply and reliably generating a desired simulation model.

Inasmuch as the positions of the definition points are displayed in superposed relation to the interference analytic model and the dynamic characteristic analytic model, the operator can visually recognize the positions of the definition points. Therefore, it is easy for the operator to visually recognize specification values that are entered at the respective definition points.

When definition points are entered or updated in any one of the specification value entering window, the interference analytic window, and the dynamic characteristic analytic window, the entered or updated definition points are reflected in each of the other windows. Therefore, specification values may be entered or updated at definition points in any one of these windows.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of assisting in the design of a vehicular suspension to generate a simulation model for a suspension using a CAD system, comprising the steps of:
    indicating a suspension to be designed;
    opening a specification value entering window for entering specification values corresponding to the indicated suspension predetermined definition points thereof;
    opening a first analytic window for displaying a first analytic model of the indicated suspension and the predetermined definition points thereof;
    opening a second analytic window for displaying a second analytic model of the indicated suspension and the predetermined definition points thereof;
    entering the specification values corresponding to the predetermined definition points of the indicated suspension in any one of said specification value entering window, said first analytic window, or said second analytic window;
    reflecting the specification values associated with the predetermined definition points that have been entered in one of the windows so that the specification values are associated with the predetermined definition points as shown in each of the two other windows; and
    generating a simulation model based on the specification values at the predetermined definition points.

2. The method of assisting in the design of a vehicular suspension according to claim 1, wherein the step of indicating further comprises the step of indicating a drive system of a vehicle to which the suspension is applied.

3. The method of assisting in the design of a vehicular suspension according to claim 2, wherein said step of opening said specification value entering window further comprises the steps of:
    entering three-dimensional coordinates into a kinematics coordinate area as the specification values at the predetermined definition points of a three-dimensional model; and
    entering lengths and angles of mechanisms of the indicated suspension into a geometry area as the specification values,
    the kinematics coordinate area and the geometry area being arranged side by side, and
    the kinematics coordinate area including a listing of the predetermined definition points, and the geometry area including a listing of the lengths and the angles of the mechanisms.

4. The method of assisting in the design of a vehicular suspension according to claim 1, wherein said step of opening the first analytic window for displaying the first analytic model further comprises the step of:
    analyzing whether there is an interference between various parts of the indicated suspension, the first analytic model being an interference analytic model.

5. The method of assisting in the design of a vehicular suspension according to claim 4, wherein said step of opening the second analytic window for displaying the second analytic model further comprises the step of:
    displaying compression and expansion strokes of front and rear wheels of a vehicle, and strokes of the front and rear wheels when the vehicle is occupied by passengers and not occupied by passengers, the second analytic model being a dynamic characteristic model.

6. An apparatus for assisting in the design of a vehicular suspension to generate a simulation model for a suspension using a CAD system, comprising:
    means for indicating a suspension to be designed;
    means for opening a specification value entering window for entering specification values corresponding to the indicated suspension predetermined definition points thereof;
    means for opening a first analytic window for displaying a first analytic model of the indicated suspension and the predetermined definition points thereof;
    means for opening a second analytic window for displaying a second analytic model of the indicated suspension and the predetermined definition points thereof;
    means for entering specification values corresponding to the predetermined definition points of the indicated suspension in any one of said specification value entering window, said first analytic window, or said second analytic window;
    means for reflecting the specification values associated with the predetermined reference points that have been entered in the one of the windows so that the specification values are associated with the predetermined definition points as shown in each of the two other windows; and
    means for generating a simulation model based on the specification values at the predetermined definition points.

7. The apparatus for assisting in the design of a vehicular suspension according to claim 6, wherein said means for indicating further comprises means for indicating a drive system of a vehicle to which the suspension is applied.

8. The apparatus for assisting in the design of a vehicular suspension according to claim 7, wherein said means for opening said specification value entering window further comprises:
    means for entering three-dimensional coordinates as the specification values at the predetermined definition points of a three-dimensional model includes a kinematics coordinate area; and
    means for entering lengths and angles of mechanisms of the indicated suspension as specification values includes a geometry area,
    the kinematics coordinate area and the geometry area being arranged side by side, and the kinematics coordinate area including a listing of the predetermined definition points, and the geometry area including a listing of the lengths and the angles of the mechanisms.

9. The apparatus for assisting in the design of a vehicular suspension according to claim 6, wherein said means for opening the first analytic window for displaying a first analytic model further comprises:

means for analyzing whether there is an interference between various parts of the indicated suspension, the first analytic model being an interference analytic model.

10. The apparatus for assisting in the design of a vehicular suspension according to claim 9, wherein said means for opening the second analytic window for displaying a second analytic model further comprises:

means for displaying compression and expansion strokes of front and rear wheels of a vehicle, and strokes of the front and rear wheels when the vehicle is occupied by passengers and not occupied by passengers, the second analytic model being a dynamic characteristic analytic model.

11. The method for assisting in the design of a vehicular suspension according to claim 1, further comprising the step of:

highlighting the specification values corresponding to the indicated suspension, and disabling entry of the specification values not corresponding to the indicated suspension.

12. The method for assisting in the design of a vehicular suspension according to claim 1, further comprising the steps of:

confirming positions of the predetermined definition points in the first analytic window and the second analytic window, if an entry from the specification value entering window is selected; and displaying the first analytic window and the second analytic window together with the specification value entering window in a same displayed view.

13. The apparatus for assisting in the design of a vehicular suspension according to claim 6, further comprising:

means for highlighting the specification values corresponding to the indicated suspension, and disabling entry of the specification values not corresponding to the indicated suspension.

14. The apparatus for assisting in the design of a vehicular suspension according to claim 6, wherein if an entry from the specification value entering window is selected, then an operator confirms positions of the predetermined definition points in the first analytic window and the second analytic window, the first analytic window and the second analytic window being displayed together with the specification value entering window in a same displayed view.

15. The method of assisting in the design of a vehicular suspension according to claim 1, wherein the step of entering the specification values in the first analytic model changes the specification values in said specification value entering window and the specification values in the second analytic model.

16. The method of assisting in the design of a vehicular suspension according to claim 1, wherein the step of entering the specification values in the first analytic window changes the specification values in said specification value entering window and the specification values in the second analytic window.

17. The method of assisting in the design of a vehicular suspension according to claim 1, further comprising the step of entering the specification values in the first analytic window by dragging the predetermined definition points of the first analytic model to move spatial coordinates thereof, thereby changing a configuration of the simulation model.

* * * * *